Feb. 18, 1969  W. WAGNER  3,428,075
SPRING RETRACTABLE LINE PIERCING VALVE
Filed Aug. 8, 1966
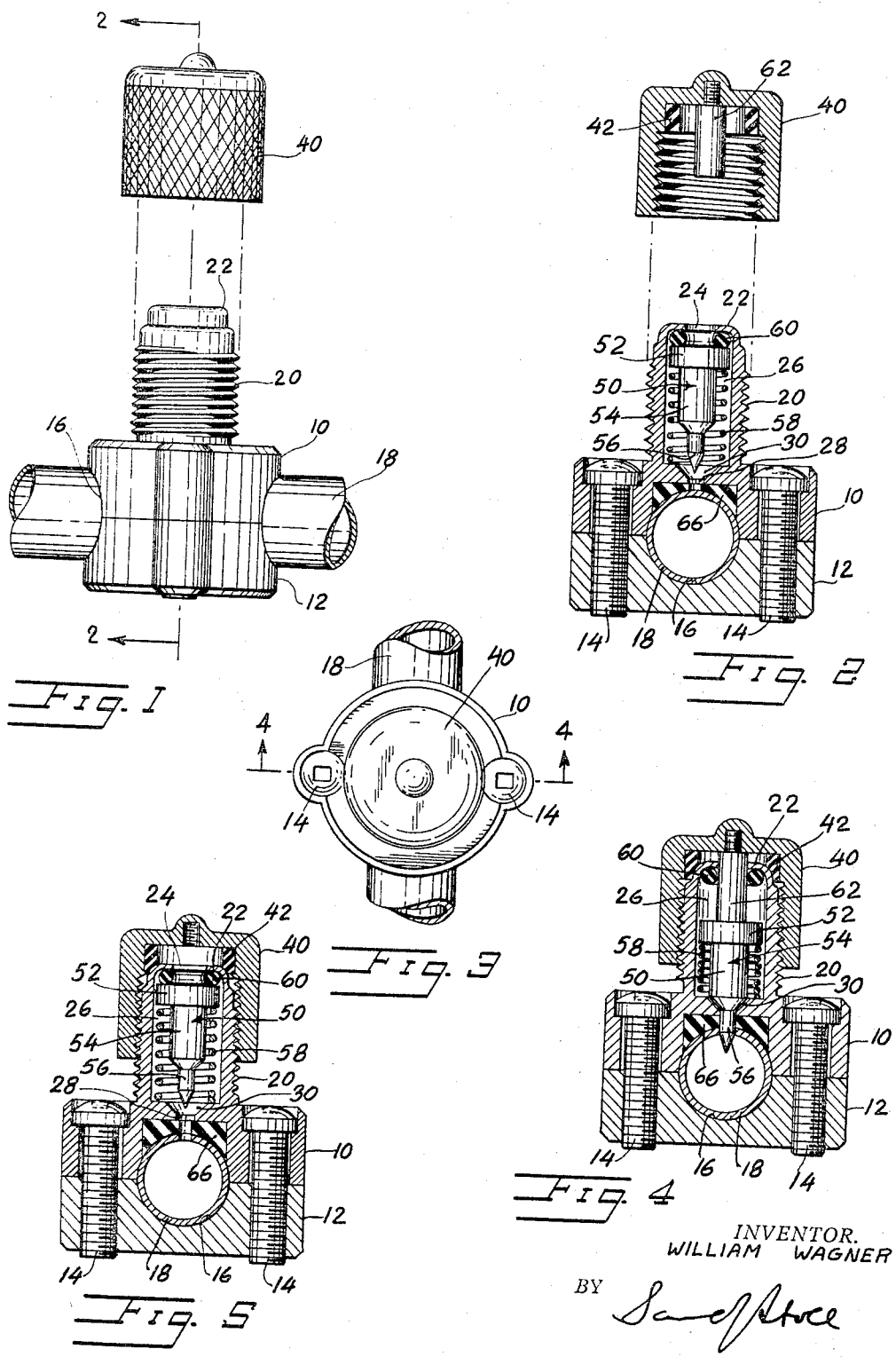
INVENTOR.
WILLIAM WAGNER
BY
ATTORNEY

United States Patent Office 3,428,075
Patented Feb. 18, 1969

3,428,075
SPRING RETRACTABLE LINE PIERCING VALVE
William Wagner, Miami, Fla., assignor to
Watsco, Inc., Hialeah, Fla.
Filed Aug. 8, 1966, Ser. No. 570,911
U.S. Cl. 137—318                    6 Claims
Int. Cl. F16l 41/04

ABSTRACT OF THE DISCLOSURE

A line tube piercing valve assembly having a single enclosure for the piercing needle and for flow communication with the tapped line in which the piercing needle is spring-urged away from the line into sealing contact with a gasket. A depressor pin is removably inserted into the top of the enclosure in sealing engagement with the same gasket for depressing the needle and piercing line. The depressor pin is removable both from the enclosure and from a threaded cap which provides piercing advancement. The depressor pin is removably threaded to the cap.

---

The present invention provides a novel piercing needle and valve assembly for permanent installation on pressure lines.

Closed pressure systems having connecting tubing and other conduits require periodic inspections to determine pressures and, if necessary, repressurizing to proper levels of pressure. A primary example is refrigeration systems having recirculating refrigerants and coolants which must function at relatively precise and constant pressures. It is necessary to determine refrigerant pressures at different stages of the system of periodic intervals and occasionally recharge the system.

Accordingly the present invention provides a valve assembly which may be permanently placed at desired locations on pressure system lines.

The present invention provides a valve assembly which permits access to pressure systems an unlimited number of times for inspection or recharging.

The present invention also provides a valve assembly which permits access to pressure systems with standard tools such as, for example, automobile tire valve pressure gauges and air hose head valves.

The present invention further provides a valve assembly which may easily be placed on tubing and other conduits of pressure systems at whatever location or locations desired, including relatively inaccessible and confined locations.

The present invention still further provides a valve assembly which pierces a hole in the tubing of pressure systems and which provides complete sealing against leakage during and after the piercing.

Briefly, the present invention comprises a spring-urged retractive piercing needle which both pierces the tube and then acts as a valve to prevent leakage yet permit access to the pressure line.

In the drawing:

FIGURE 1 is a front view of the line piercing valve assembly of the present invention mounted on a pressure line showing its cap removed and above the valve assembly.

FIGURE 2 is a cross-sectional view as taken across line 2—2 of FIGURE 1.

FIGURE 3 is a top view of the line piercing valve assembly of the present invention with its cap in place.

FIGURE 4 is a cross-sectional view as taken across line 4—4 of FIGURE 3 showing the depressor pin actuating the piercing needle.

FIGURE 5 is a cross-sectional view similar to that in FIGURE 4 but showing the depressor pin removed and the valve closed.

Referring to the drawing, the valve assembly comprises an upper housing 10 and a lower housing 12 both of which have similar generally cylindrical overall side contours and which are secured to each other by two bolts 14 which threadedly engage lower housing 12. Bolts 14 may, of course, be of any common type, FIGURE 3 showing Allen wrench sockets by way of example. Upper housing 10 and lower housing 12 when bolted together define a transverse cylindrical bore 16 between them, the upper half of which is in upper housing 10 and the lower half of which is in lower housing 12. Bore 16 is so dimensioned as to firmly accommodate standard tubing; that is, upper and lower housings 10 and 12 respectively may be tightly clamped in any desired location around a tube 18, tube 18 being securely held in bore 16.

Upper housing 10 has a centrally located valve enclosure 20 which encloses within its cylindrically shaped shell the needle valve hereinbelow described. Enclosure 20 has a top 22 with a central hole 24 which communicates with the interior 26 of said enclosure 20, interior 26 also communicating with bore 16 by way of a hole 28 in upper housing 10, the upper portion of which is formed by a frustoconical guide and seat 30. Enclosure 20 is externally threaded to threadedly receive an internally threaded closure cap 40. Cap 40 has a ring gasket 42 which tightly seals against top 22 when cap 40 is screwed onto enclosure 20.

A piercing needle and valve 50 is disposed in interior 26 of enclosure 20 and is comprised of a disc-shaped head portion 52, a shank portion 54 and a pointed needle portion 56, the lower part of shank 54 connecting with needle 56 being frustoconical in shape. A compression coil spring 58 surrounds shank portion 54 and bears between the underside of head portion 52 on the one hand and upper housing 10 on the other hand thereby urging needle valve 50 upward. In the uppermost position of needle valve 50, head portion 52 engages an O-ring gasket 60 thereby sealing off interior 26 from hole 24 and the outside of enclosure 20.

Cap 40 has a depressor pin 62 which is threadedly removable from the inside of said cap 40. Depressor pin 62 is adapted to enter hole 24 and engage and depress head portion 52 of needle valve 50 when cap 40 is screwed onto enclosure 20.

To use the spring retractable line piercing valve, upper and lower housings 10 and 12 respectively are bolted onto tubing 18, tube 18 being securely clamped in bore 16 as shown in FIGURES 1 and 2. If it is desired to pierce tube 18, cap 40 with depressor pin 62 in place is screwed onto enclosure 20, depressor pin 62 thereby engaging head portion 52 and pushing needle valve 50 downwardly. Needle portion 56 accordingly moves downwardly in hole 28 and pierces a hole in tube 18 as shown in FIGURE 4. Cap 40 is removed and needle valve 50 is urged upwardly against O-ring gasket 60. A charging hose nozzle or gauge of standard variety having a depressor pin similar to but smaller in diameter and length than depressor pin 62 may readily be placed on enclosure 20 for pressurizing, depressurizing, charging, checking or other such functions with respect to tube 18 and its contents. Examples of such standard charging devices and gauges are automotive tire pressure hose nozzles and tire pressure gauges. When the checking or charging process is completed, cap 40 with depressor pin 62 removed therefrom is screwed onto enclosure 20 as shown in FIGURE 5.

Complete sealing is effected at all times by the present invention. Depressor pin 62 seals against O-ring 60 as may be seen in FIGURE 4. Head portion 52 is urged against O-ring 60 by spring 58. Needle portion 56 engages a relatively soft sealing block 66 which surrounds and forms the lower portion of hole 28, which forms the upper portion of bore 16 in upper housing 10 and which seals against tube 18 around the hole pierced therein. Ring gasket 42 seals against top 22.

While the foregoing constitutes a preferred embodiment of the invention it is clear that modifications and other embodiments may be provided within the broad spirit of the invention and the broad scope of the claims.

What is claimed is:
1. A spring retractable line piercing valve, comprising:
   an upper housing,
   a lower housing, said lower housing being fastenable to said upper housing to define a transverse bore therebetween,
   a valve enclosure, said valve enclosure being located on said upper housing and having an open top with a ring gasket disposed circumferentially of the opening,
   a piercing valve, said piercing valve being disposed within said valve enclosure and above the bore and being depressable into said bore,
   a spring, said spring urging said piercing valve away from said bore into sealing contact with said ring gasket,
   a sealing cap, said sealing cap being threadedly engageable with said valve enclosure, and
   a removable depressor pin, said removable depressor pin being removably threaded to said sealing cap in co-axial alignment with said piercing valve for bearing against and depressing said piercing valve axially toward said bore to pierce a line tube therein upon threaded advancement of said sealing cap, said removable depressor pin being in sealing engagement with said ring gasket, there being selective flow communication with said tapped line through said valve enclosure.

2. A spring retractable line piercing valve in accordance with claim 1, wherein:
   said piercing valve is comprised of an upper head portion, a middle shank portion and a lower needle portion.

3. A spring retractable line piercing valve in accordance with claim 2, wherein:
   said valve enclosure has an upper opening and a lower opening formed therein, said upper opening therein being adapted to pass said depressor pin therethrough and said lower opening therein being adapted to pass said needle portion of said piercing valve therethrough.

4. A spring retractable line piercing valve in accordance with claim 3, wherein:
   said lower opening formed in said valve enclosure is substantially frustoconical in shape, and
   said piercing valve additionally has a substantially frustoconical portion disposed between the shank and needle portions thereof, whereby said lower opening and said frustoconical portion engage each other to limit downward movement of said piercing valve.

5. A spring retractable line piercing valve in accordance with claim 4, additionally comprising:
   a sealing block, said sealing block being disposed in said upper housing beneath said lower opening formed in said valve enclosure, said needle portion of said piercing valve passing through said sealing block and being sealed therewith against outflow from the pierced line tube.

6. A spring retractable line piercing valve in accordance with claim 3, additionaly comprising:
   an annular gasket, said annular gasket being disposed within said valve enclosure concentrically with said upper opening formed therein, said spring urging said piercing valve into contact with said annular gasket thereby sealing against outflow from the pierced line tube.

References Cited

UNITED STATES PATENTS

| 1,622,831 | 3/1927 | Kirkegaard | 220—27 |
| 3,038,490 | 6/1962 | Yocum | 137—318 |
| 3,198,206 | 8/1965 | O'Brien | 137—318 X |
| 3,252,474 | 5/1966 | Ehrens et al. | 137—318 |

FOREIGN PATENTS

340—601  10/1959  Switzerland.

ALAN COHAN, *Primary Examiner.*

D. R. MATTHEWS, *Assistant Examiner.*

U.S. Cl. X.R.

285—197